Aug. 27, 1963  V. N. DZENIS  3,101,540
APPARATUS FOR PREPARING CHEESE AND THE LIKE
Filed Nov. 28, 1961  2 Sheets-Sheet 1

Visvaldis N. Dzenis
INVENTOR.

Aug. 27, 1963 V. N. DZENIS 3,101,540
APPARATUS FOR PREPARING CHEESE AND THE LIKE
Filed Nov. 28, 1961 2 Sheets-Sheet 2
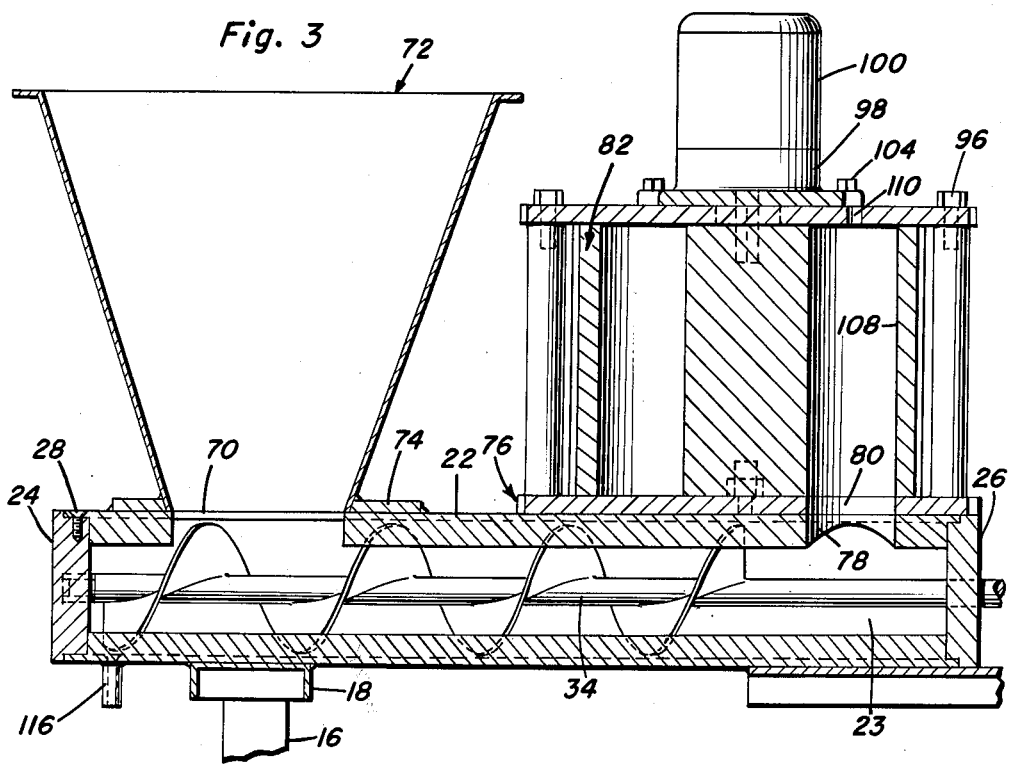
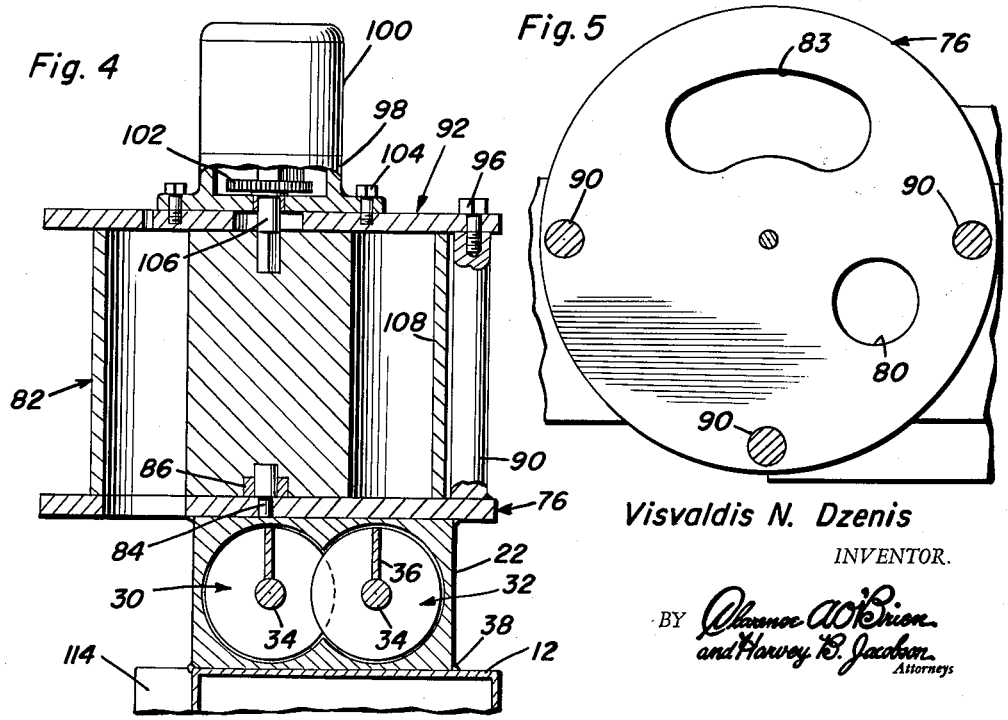
Visvaldis N. Dzenis
INVENTOR.
BY Clarence A. O'Brien
and Harvey B. Jacobson
Attorneys

United States Patent Office 3,101,540
Patented Aug. 27, 1963

3,101,540
APPARATUS FOR PREPARING CHEESE
AND THE LIKE
Visvaldis N. Dzenis, 100 Hawthorne Ave.,
Bloomfield, N.J.
Filed Nov. 28, 1961, Ser. No. 155,399
5 Claims. (Cl. 31—42)

This invention relates to apparatus for forming, shaping, and measuring predetermined quantities of plastic material, and more particularly to an apparatus for production, shaping, forming, measuring and dispensing curd for Italian cheese varieties including provolone, mozzarella, etc.

This invention is an improvement over the apparatus disclosed in my prior Patent 2,840,909, issued July 1, 1958. The machine disclosed in that patent was designed primarily for preparing cheese packages or quantities weighing less than one pound. The improvement disclosed herein is intended primarily for forming, shaping and measuring quantities of cheese weighing one pound or more.

Accordingly, it is a primary object of this invention to provide an apparatus particularly adapted for the proportioning, forming and discharging automatically and continuously quantities of plastic foodstuffs weighing over one pound each.

In order to produce Italian cheese varieties as mozzarella, salamini, provoloncini, provolone, etc., the raw curd is made from milk and then this curd is properly cured after which this cured curd is subjected to mixing and stretching in order to produce the homogeneous, plastic, stretchy mass of cheese dough necessary for properly making cheese. The plastic cheese dough is then molded into items of desired size and shape. All the prior art devices for molding the cheese dough for production of various cheese varieties are either manually operated or semi-manually operated. These prior art devices require manual chopping, tearing or cutting by hand small pieces or portions from the main portion of the plastic curd and then modifying this irregular, unmolded, unsealed portion into a compact, smooth commercial shape which is sealed and formed with a smooth mirror-like skin. There are some automatic, continuous machines for forming mozzarella cheese in portions of one pound or less. However, the manufacture of large portions of cheese is now done exclusively by hand. There have been prior attempts to mechanize the production of large portions of Italian cheese varieties, however, these attempts have failed because a mechanical device for automatically making cheese is successful only when the cheese produced thereby is of equal quality or superior to the handmade product.

Accordingly, it is another primary object of this invention to provide a device for forming and preparing cheeses of large portions automatically and continuously in such a manner that the cheese produced is of equal quality or superior than like cheeses produced by hand.

It is still another object of the invention to provide a device for preparing and forming various cheeses uniformly of proper texture, and in a sanitary manner.

It is another object of the invention to provide a device for preparing cheese which is of relatively simple design, economical to manufacture, durable and reliable in use, and relatively easy to maintain.

It is another object of the invention to provide a device for automatically preparing, forming, measuring and dispensing portions of cheeses which is provided with a removable die so that it may be replaced with other types of dies so as to proportion the cheese in different sized quantities or in different shapes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged cross-sectional elevational view taken substantially on the plane of line 3—3 in FIGURE 1;

FIGURE 4 is an enlarged vertical cross-sectional view taken substantially on the plane of line 4—4 in FIGURE 2;

FIGURE 5 is an enlarged horizontal cross-sectional view taken substantially on the plane of line 5—5 in FIGURE 2;

Figure 1:
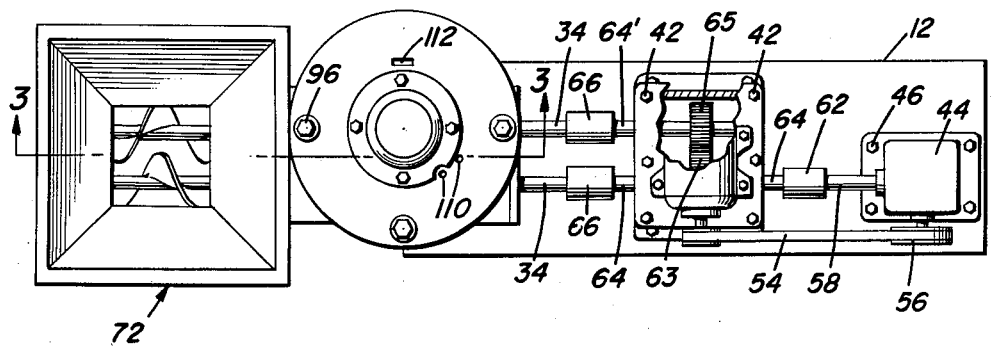
FIGURE 1 is a plan view of the invention.

With continuing reference to the accompanying drawings wherein like reference numerals designate similar parts throughout the various views, reference numeral 10 generally designates a framework of any convenient design for supporting the cheese making machine. The frame 10 perferably comprises a platform 12 of generally rectangular shape and U-shaped or channel shaped in cross section. Each side of the central portion of the platform 12 is rigidly secured to and supported on a pair of parallel, laterally spaced legs 14. A similar pair of legs 16 are connected to the ends of a rectangular channel member 18. Each leg 16 is connected to one of the legs 14 by means of a horizontally extending brace member 20.

Supported on the upper surfaces of the channel member 18 and platform 12 and extending therebetween is an auger housing 22 of eight shaped cross section. The housing 22 is fitted with removable end plates 24 and 26 which each have recessed portions extending telescopically within the housing and secured thereto by removable means such as screws 28.

Rotatably journalled within bores in the end plates 24 and 26 are two parallel, laterally spaced augers 30 and 32 having closely interspaced spiral flights 36, and it is noted that flights 36 terminate short of the outlet 78 thus forming a compression chamber 23 between the terminated flights and end plate 26. Each of the augers includes a circular shaft 34 and a plate 36 spiralled about one of the shafts to form a helix. As shown in FIGURE 4, the shafts 34 while parallel, are spaced so that the two helical plates 36 intermesh one another. This is also illustrated in FIGURE 1.

Figure 2:
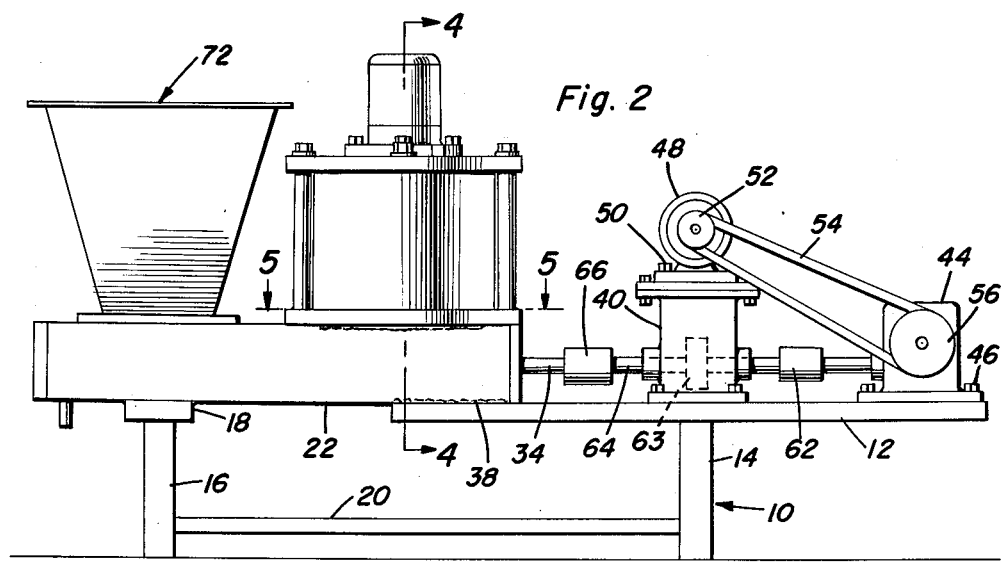
FIGURE 2 is a side elevational view of the device shown in FIGURE 1.
Figure 6:
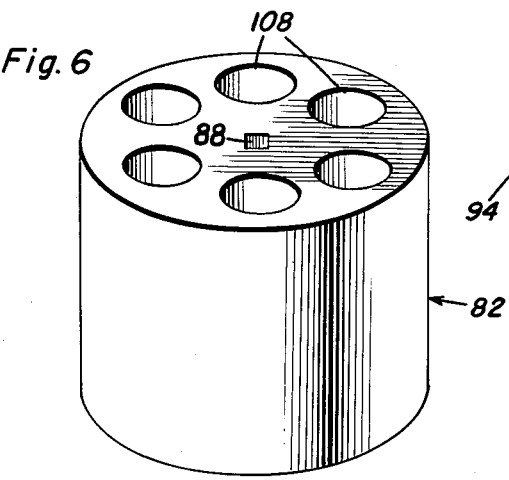
FIGURE 6 is a perspective view of a die used in the machine.
Figure 7:
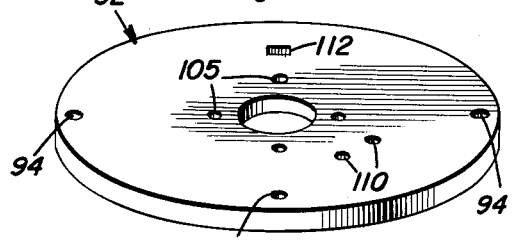
FIGURE 7 is a perspective view of a detail.

It is to be noted that as viewed in FIGURE 2, the right end of the housing 22 is rigidly secured to the platform 12 by means of welds 38. A transmission housing 40 is secured by bolts 42 to the upper central surface of the platform 12. A gear housing 44 is secured to the outer end of the platform 12 by means of bolts 46. A conventional electrical motor 48 is secured to the upper surface of the transmission housing 40 by means of bolts 50 threaded into the housing 40.

The motor 48 is directly connected to a driving pulley 52 which in turn is drivingly connected by means of a V-belt 54 to the input shaft of the reduction gearing within housing 44 by means of a larger pulley 56. The output shaft 58 of the reduction gearing is connected to the shaft 64 of the transmission within housing 40 by means of a flexible coupling or universal joint 62. Mounted on the shaft 64 in the transmission housing is a gear 63 which interchanges with one other gear 65 monuted on the second shaft 64' of the transmission housing thus driving the shaft 64' in opposite direction with both of the shafts being inwardly turning. The output ends of the shafts 64 and 64' are connected to the auger shafts 34 by means of flexible couplings or universal joints 66.

The upper surface of the auger housing 22 is provided at one end with a rectangular opening 70. A conventional hopper 72 of rectangular cross section is secured at its lower end to the housing 22 so that it surrounds and communicates with the opening 70. The opening 70 is reinforced by plates 74 which surround the opening and the lower end of the hopper and are detachably connected thereto.

A circular die base plate 76 is mounted on the inner end of the upper surface of the housing 22. The plate 76 is mounted on the housing so that one side thereof extends beyond the housing more than the other side, and the plate is secured to the housing by conventional means such as welding. The center of one end of the upper portion of the housing 22 is provided with a circular bore 78 which communicates with and is concentric with a similar bore 80 formed in the plate 76. The side of the plate 76 that projects the farthest beyond the housing 22 is provided with an arcuate elongated opening 83 whose longitudinal axis is the same distance from the center of the plate 76 as is the center of the bore 80.

A cylindrical die 82 is rotatably mounted on the upper surface of the plate 76 by means of a bearing pin 84 fixed to the base plate and having an enlarged upper end rotatably journaled in a bearing member 86 fixed to and recessed in the bottom of the die. The top of the molding die 82 is provided with a vertically extending central bore 88 which is of rectangular cross section.

A plurality of rods 90, preferably three, of the same or slightly greater height than the die 82 are secured to and spaced as shown in FIGURE 5 around the edge of the base plate 76. A circular cover plate 92 of the same size as the base plate 76 has a plurality of vertical bores 94 in its edges which receive bolts 96 which in turn are threaded within recesses in the upper ends of the rods 90 so as to rigidly maintain the cover plate 92 and base plate 76 in spaced, parallel, concentric relationship.

As shown in FIGURE 4, the cylinder 82 is of slightly smaller diameter than the plates 92 and 76 and the rods 90 are spaced radially outwardly therefrom. A gear housing 98 containing reduction gears 102 is bolted by means of bolts to the upper central portion of the plate 92. The housing 100 of an electric motor is secured by conventional means to the upper edges of the gear housing 98. The drive shaft of the motor 100 drives the input to the gearing 102 and drives the output shaft 106 thereof through the gearing 102 at a reduced speed. The shaft 106 is journalled in the base plate of the housing 98 and its lower end is of rectangular cross section so as to drivingly engage within the rectangular recess 88 of the die member 82.

The die member 82 is provided with a plurality of vertical bores 108 arranged concentrically around its vertical axis the same radial distance as is the bore 80 and arcuate slot 83 is located from the center of plate 76. The flat parallel ends of the cylinder 82 are highly finished as are the surfaces of the plates 76 and 92 with which the ends of the cylinder rotatably engage.

The cover plate 92 is provided with a plurality of vent bores 110 in vertical alignment with the bore 80 in the plate 76 and a vent hole 112 in vertical alignment with the arcuate slot 83.

In operation, the hopper 72 is loaded with a substantial quantity of cured cheese curd. The curd passes through the opening 70 where it is picked up by the rotating augers and forced to the right end of the auger housing 22 as viewed in FIGURE 3. The curd is gently compressed by the augers in the right end of the housing which constitutes a compression chamber 23. While the motor 48 is rotating the augers by means of the belt 54, the gearing in housing 44, the shafts 58 and 64, the transmission 40 and the shafts 64 and 64', at the same time, the electric motor 100 is rotating the cylindrical die 82 at a highly reduced rate of speed by means of the reduction gearing 102. Consequently, as one of the cylindrical bores 108 in the die 82 becomes partially aligned with the bore 80 in plate 76, the cheese is forced from the compression chamber 23 upwardly through bores 78 and 80 into the die bore 108. Before the bore 108 is moved out of alignment with the bore 80, it is tightly filled with curd. The vents 110 permit the air to escape from the bores 108 while it is being filled. As the bore 108 becomes filled, it is slowly rotated counterclockwise until it passes over and in alignment with the slot 83 and vent opening 112. Then, the cheese mix in the filled bore 108 drops by gravity through the arcuate opening 83 and through a recess 114 provided in one edge of the platform 12. A suitable container, not shown, may be placed in the recess 114 for receiving the finished cheese as it drops from the bores 108.

It is to be noted that as soon as one of the bores 108 becomes filled and passes beyond the bore 80 in plate 76, then an adjacent bore 108 becomes aligned with the bore 80 and is filled in the same manner. Thus, as long as there is curd in the hopper 72 and as long as the motors 100 and 48 are energized, my invention continuously and automatically forms, shapes, and measures the material into pieces of cheese, the size and shape of which are determined by the size and shape of the bores 108. The size and shape of the finished cheese may be determined and varied by substituting cylinders for the cylinders 82 having different sized and shaped bores therein.

During operation of the cheese making machine, the whey in the curd is separated during compression of the curd and drains from the housing 22 by means of a duct 116 provided in the lower end of the housing which is opposite from the end containing the compression chamber 23.

The kneading of the curd by the rotating augers improves the quality of the cheese produced from the curd, and the cheese produced is of equal or better quality than the cheese produced by hand.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An apparatus for preparing cheese comprising a frame, an auger housing supported on said frame, a pair of opposing turning spiral augers having flights rotatably mounted in said housing, means for driving said augers connetced thereto, hopper means mounted on said housing communicating with said housing at one end thereof for feeding mix to said housing, said housing having an outlet at the other end thereof, a compression chamber at said other end of said housing and communicating with said outlet, said spiral augers continuously conveying the mix into the compression chamber for the compression thereof and the subsequent discharge through said outlet, the conveying and compressing action of the augers constituting the sole means for effecting a discharge of the mix through the outlet, a molding die above said housing receiving mix from said outlet, means for moving said molding die, connecting means operatively connecting the last recited means to the molding die, said die comprising a member rotatably mounted on a vertical axis, a plurality of die chambers in said member, said die chambers being successively alignable with the housing outlet for reception of the mix as the die rotates, a base plate mounted on the housing between the compression chamber portion thereof and the die member, said base plate having an aperture therethrough of the same size as and in alignment with said outlet, and an elongated discharge opening spaced from said housing outlet, said die chambers being successively alignable with said discharge opening for the gravitational discharge of the molded cheese therethrough.

2. A device as defined in claim 1 wherein the action of the augers on the cheese mix tends to separate the whey from the curd, and including means for removing the separated whey from the housing.

3. A device as defined in claim 2 wherein said last mentioned means consists of a duct communicating with the interior of the housing at the hopper end thereof.

4. A device as defined in claim 1 wherein said augers and said molding die are in constant movement during the operation of the apparatus with the movement of the die past the outlet and the rotation of the augers being such as to allow a complete filling of the die chambers.

5. A device as defined in claim 4 including a cover plate over said die, said cover plate having vent openings in alignment with the outlet and discharge opening.

References Cited in the file of this patent

UNITED STATES PATENTS

| | | |
|---|---|---|
| 2,840,909 | Dzenis | July 1, 1958 |

FOREIGN PATENTS

| | | |
|---|---|---|
| 157,803 | Switzerland | Jan. 2, 1933 |
| 426,974 | Great Britain | Apr. 12, 1935 |
| 550,412 | Great Britain | Jan. 6, 1943 |